United States Patent [19]
Vezzani

[11] Patent Number: 5,902,520
[45] Date of Patent: *May 11, 1999

[54] SCRUBBER-CONDENSER FOR GAS AND VAPOUR STREAMS FROM INDUSTRIAL PROCESSES

[75] Inventor: Corrado Vezzani, Milan, Italy

[73] Assignee: Vomm Impianti E Processi S.r.L., Milan, Italy

[21] Appl. No.: 08/666,741

[22] Filed: Jun. 20, 1996

[51] Int. Cl.⁶ ........................................... B01F 3/04
[52] U.S. Cl. ........................ 261/84; 55/400; 55/467.1; 96/282; 261/88; 261/90
[58] Field of Search ..................... 55/222, 230, 400, 55/467.1; 96/214, 216, 215, 282, 283, 332, 355; 261/88, 89, 90, 83, 84, 85, 92

[56] References Cited

U.S. PATENT DOCUMENTS

| | | | |
|---|---|---|---|
| 719,844 | 2/1903 | McKee | 261/84 |
| 815,812 | 3/1906 | Gow | 261/90 |
| 943,422 | 12/1909 | Knoepfel | 55/230 |
| 1,117,614 | 11/1914 | Wilder | 261/88 |
| 1,362,302 | 12/1920 | Hansen et al. | 261/85 |
| 1,408,736 | 3/1922 | Hernu | 55/230 |
| 1,561,000 | 11/1925 | Kuehn | 55/230 |
| 1,727,152 | 9/1929 | Winkler | 261/90 |
| 3,453,808 | 7/1969 | Neuman | 96/282 |
| 3,495,383 | 2/1970 | Nelson | 261/90 |
| 3,548,568 | 12/1970 | Carlson, Jr. et al. | 261/90 |
| 3,855,404 | 12/1974 | Rotaru | 261/90 |
| 4,397,794 | 8/1983 | Pilo . | |
| 4,544,379 | 10/1985 | Elliot et al. . | |

FOREIGN PATENT DOCUMENTS

| | | | |
|---|---|---|---|
| A-0048088A2 | 3/1982 | European Pat. Off. . | |
| 594518 | 9/1925 | France | 55/230 |
| 597992 | 12/1925 | France | 55/230 |
| 821595 | 1/1952 | German Dem. Rep. | 261/90 |
| A-1946633 | 4/1971 | German Dem. Rep. . | |
| A-2362635 | 6/1975 | German Dem. Rep. . | |
| 274602 | 8/1913 | Germany | 55/230 |
| 543190 | 1/1932 | Germany | 261/88 |
| A2634886 | 2/1977 | Germany . | |
| 204857 | 10/1923 | United Kingdom | 261/90 |
| 2 065 499 | 7/1981 | United Kingdom | 55/230 |

OTHER PUBLICATIONS

Kirk–Othmer, *Encyclopedia of Chemical Technology*, 3rd Edition, vol. 1, p. 700, (1978).
E. Perucca, *Dizionario di Ingegneria*, vol. 7, p. 113, point 1.3 (1974) (partial translation).
Pat. Abstracts of JP–Pat No.A 62246147 dtd. Sep. 6, 1994 —Translation: Yes.
Pat. Abstracts of JP–Pat No.A 59150519 dtd Aug. 28, 1984 —Translation: Yes.

*Primary Examiner*—C. Scott Bushey
*Attorney, Agent, or Firm*—Ostrolenk, Faber, Gerb & Soffen, LLP

[57] ABSTRACT

Apparatus for the purification of gas and vapor streams by the removal of solid, liquid or aeriform polluting substances; the apparatus including a stator formed as a tubular body having a cylindrical inner wall, which body is furnished with at least one inlet aperture for the admission of gas or vapor streams containing solid, liquid or gaseous impurities and with at least one discharge aperture, a coaxial rotor extending longitudinally and revolvably supported inside the tubular body in such a way as to define with the cylindrical wall at least one annular passage, and an inlet for the admission of liquid into the tubular body.

8 Claims, 1 Drawing Sheet

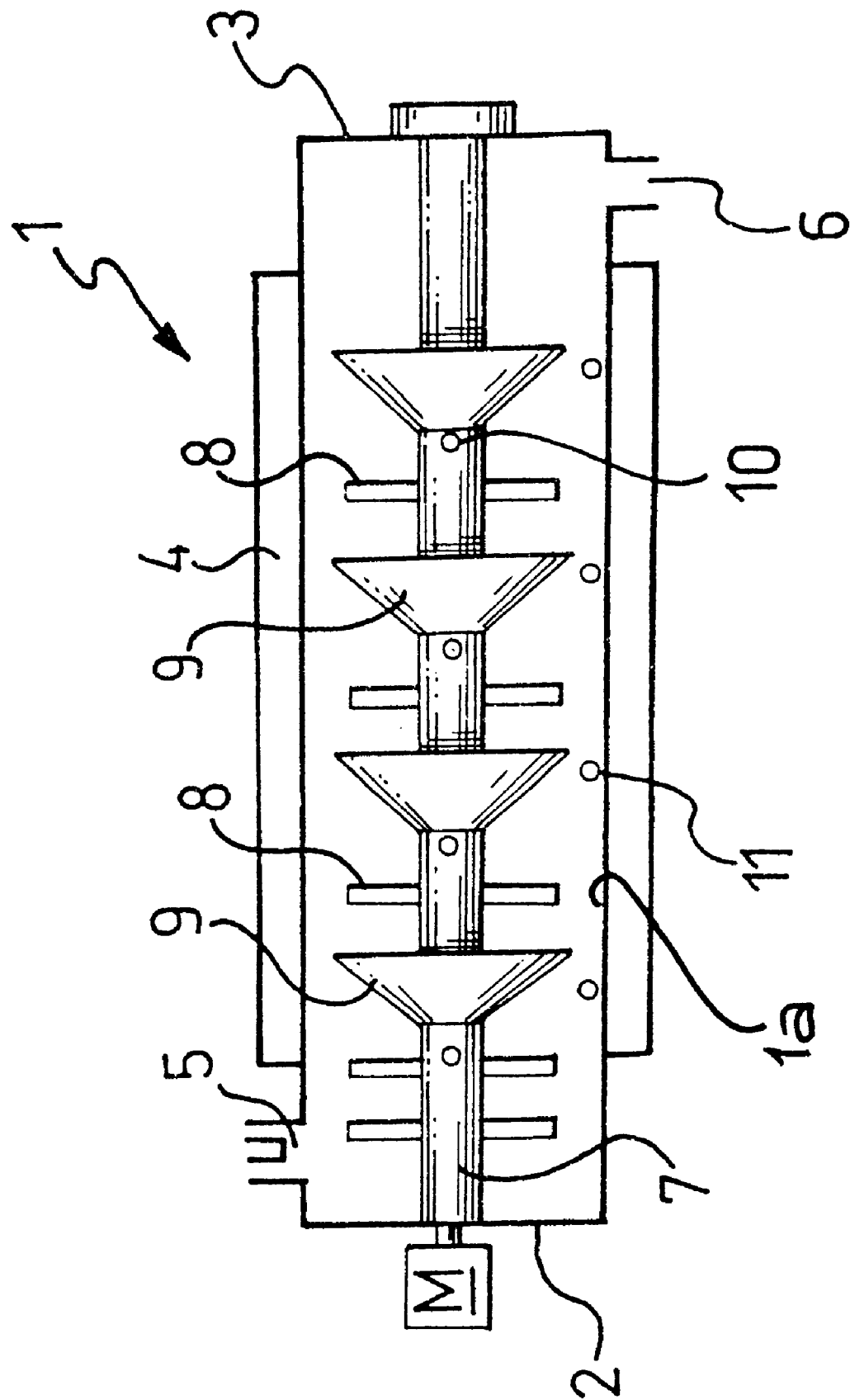

SCRUBBER-CONDENSER FOR GAS AND VAPOUR STREAMS FROM INDUSTRIAL PROCESSES

FIELD OF THE INVENTION

In its more general aspect the present invention relates to an apparatus for the purification of gas and vapour streams, from industrial processes, by the removal of solid, liquid or aeriform polluting substances.

In particular, the invention relates to an apparatus which effects the abovementioned purification under dynamic conditions.

BACKGROUND OF THE INVENTION

Various types of apparatuses are known in the art which effect the purification of gases by the removal of polluting substances by scrubbing with a suitable liquid. Among these may be mentioned scrubbing columns, cyclone scrubbers and Venturi type scrubbers.

These latter apparatuses comprise a Venturi tube through which a gas is made to pass and into the throat of which is sprayed the scrubbing liquid. Through the effect of the high gas velocity, the liquid is finely atomized and the intimate contact achieved allows good dissolution of the soluble pollutants and good capture of the insoluble pollutants. The Venturi tube is connected to a cyclone in which the liquid droplets together with the entrained impurities are eliminated.

However, the effectiveness of Venturi scrubbers drops when the dimensions of the particles of the pollutants fall to micron levels, since these tend to be expelled in the form of an aerosol.

SUMMARY OF THE INVENTION

The problem underlying the present invention is that of making available an apparatus for the purification of gases or vapours from industrial processes by the removal of solid, liquid or aeriform polluting substances, which has high efficiency and in particular makes it possible to eliminate to the maximum degree the condensable aeriform impurities contained in the above-mentioned gases.

This problem is solved, according to the invention, by an apparatus comprising:
- a stator consisting of a tubular body having a cylindrical inner wall, which body is closed at opposite extremities and is furnished with at least one inlet aperture for the admission of gas or vapour streams containing solid, liquid or gaseous impurities and with at least one discharge aperture,
- a coaxial rotor extending longitudinally and revolvably supported inside the said tubular body in such a way as to define with the said cylindrical wall at least one annular passage,
- means for the admission of liquid into the said tubular body.

The abovementioned rotor preferably consists of a driven shaft furnished with radial elements.

These radial elements consist of groups of blades, cones, screw spans and the like.

The tubular body is preferably provided with a cooling jacket.

Preferably an apparatus according to the invention comprises:
- a tubular body, having an inner wall, which is furnished with a cooling jacket and is closed at opposite extremities by end plates and is furnished with at least one inlet aperture for the admission of a gas or vapour stream containing solid, liquid or gaseous impurities and with at least one discharge aperture,
- a driven shaft extending longitudinally and rotatably supported inside the said tubular body,
- at least one group of blades fixed radially on the said shaft,
- at least one cone fixed radially on the said shaft, the base of which faces the said discharge aperture and has a diameter almost equal to the diameter of the inner wall of the said tubular body, with which it forms an annular passage,
- means for the admission of liquid into the said tubular body upstream of the said at least one cone.

Preferably, the abovementioned shaft is hollow and one or more apertures made therein constitute the abovementioned means for the admission of liquid into the said tubular body.

The abovementioned apertures are preferably made in proximity to the apex of the said at least one cone.

Expediently, the apparatus according to the invention further comprises one or more liquid spray admission nozzles on the inner wall of the said tubular body at its lateral surface.

According to a preferred embodiment of the invention, the apparatus comprises a plurality of groups of blades and a plurality of cones.

The advantages and characteristics of this invention will emerge more clearly from the description of an apparatus for the purification of gases or vapours from industrial processes by the removal of solid, liquid or aeriform polluting substances, given below with reference to the appended drawing.

BRIEF DESCRIPTION OF THE DRAWING

The appended drawing a schematic longitudinal sectional view of the apparatus according to the invention.

DETAILED DESCRIPTION OF THE INVENTION

With reference to the abovementioned figure, an apparatus according to the invention comprises a tubular body 1, having a cylindrical inner wall 1a, which tubular body 1 is arranged with its axis horizontal and is closed at the opposite extremities by ends 2, 3, and coaxially furnished with a cooling jacket 4, intended to have water or some other refrigerating liquid passed through it in order to maintain the inner wall of the said body 1 at a prefixed temperature.

The tubular body 1 is furnished with an inlet aperture 5 for the gas or vapour to be subjected to purification and with a discharge aperture 6.

Supported rotatably inside the tubular body 1 is a driven hollow shaft 7 furnished with blades 8 arranged helically and oriented so as to centrifuge and convey the gas or vapour subjected to treatment towards the discharge aperture 6.

Additionally, fixed radially on the shaft 7 are cones 9, the base of which faces the discharge aperture 6 and has a diameter almost equal to the diameter of the tubular body 1.

At the apex of each cone 9, the shaft 7 has apertures 10 for the admission of a liquid.

The inner wall of the tubular body 1 has apertures 11 for the spray admission of a liquid.

According to a non-binding interpretation, the operation of the apparatus could be as follows.

The gas or vapour stream which is to be purified by the removal of solid, liquid or gaseous impurities is admitted into the tubular body 1 through the inlet aperture 5 and there it is subjected to extremely intense mechanical action by the blade 8 of the shaft 7, which revolves at a speed of between 200 and 1000 revolutions/minute.

Consequent upon such intense mechanical action, a considerable forward thrust and an extremely turbulent motion is imparted to the gas.

The gas, when it reaches the lateral surface of the cone 9, enters into contact with the liquid admitted into the tubular body 1 through the apertures 10 and is then forced, under the thrust imparted by the blades 8, to pass through the extremely narrow gap between the base of the cone 9 and the inner wall of the body 1.

At this point the velocity of the gas increases enormously and further increases its already high turbulence while its pressure decreases simultaneously; at the same time the liquid is very finely atomized, while the temperature of the inner wall 1a of the tubular body 1 is kept at low values by virtue of the cooling jacket 4.

These conditions together produce very intimate contact between the water droplets of the liquid and the solid and liquid impurities contained in the gas and bring about the condensation of any condensable gaseous impurities; all this is done with greater efficiency than that of prior art apparatuses.

The effects of the apparatus according to the invention are magnified if provision is made for the presence of several banks of radial elements of various design, such as blades, cones and screw spans, and in particular when groups of blades 8 and cones 9 are alternated. This may be useful in cases where the impurities contained in the gas to be treated are of very small dimensions or are difficult to condense.

The purifying action of the apparatus according to the invention can be further enhanced if, in addition to the liquid introduced into the body 1 through the apertures 10, another liquid is admitted as a spray into the abovementioned body 1 through the apertures 11.

The liquid admitted into the body 1 consists, in most cases, of water; however, should the gas to be treated contain liquid or gaseous impurities of a hydrophobic nature (for example aliphatic or aromatic hydrocarbons), advantageous use may be made of a solvent from the family of polyalkylene glycols, such as available under the trademark CELLOSOLVE.

The apparatus according to the invention makes it possible to purify variable gas or vapour flow rates, depending on the turbulence which is desired and on the quantity of liquid admitted.

With the apparatus of the invention it is possible to eliminate particles of dimensions less than one micrometre from the treated gases or vapours.

A major advantage of the apparatus according to the invention is that it allows the possibility of regulating the efficiency of the purification process on the basis of the characteristics of the gaseous material to be treated, by altering the speed of rotation of the driven shaft and the temperature of the liquid contained in the refrigerating jacket.

Another advantage, of undeniable industrial benefit, of the apparatus according to the invention consists in the fact that there is no formation of scale and it is de facto self-cleaning.

Obviously, for contingent technical and technological reasons, the apparatus according to the invention can be furnished with one or more cooling jackets so as to produce a temperature gradient along the apparatus and thus effect a heat exchange geared towards particular working requirements.

I claim:

1. An apparatus for contacting a gas or vapour streams containing solid, liquid or aeriform polluting substances with liquid, which comprises:

a tubular body, having a cylindrical inner wall, which tubular body is furnished with a cooling jacket and is closed at opposite extremities by end plates and is furnished with at least one inlet aperture for the admission of a gas or vapour stream containing solid, liquid or gaseous impurities and with at least one discharge aperture, a driven shaft extending longitudinally and rotatably supported inside said tubular body, at least one group of blades fixed radially on said shaft, at least one cone fixed radially on said shaft, the base of which faces said discharge aperture, has a radius greater than the radial length of the blades, and has a diameter almost equal to the diameter of the inner wall of said tubular body, with which it forms an annular passage, means for the admission of liquid into said tubular body upstream of said at least one cone.

2. Apparatus according to claim 1, wherein said shaft comprises a tubular wall defining a bore therethrough and, at the apex of said at least one cone, said tubular wall has at least one aperture constituting said means for the admission of liquid into said tubular body.

3. Apparatus according to claim 2, which comprises a plurality of groups of blades and a plurality of cones, said plurality of blades and plurality of cones being alternately spaced axially along said shafts.

4. Apparatus according to claim 1, which further comprises, on the inner wall of said tubular body, at its lateral surface, one or more liquid spray admission nozzles.

5. Apparatus according to claim 2, which further comprises, on the inner wall of said tubular body, at its lateral surface, one or more liquid spray admission nozzles.

6. Apparatus according to claim 1 wherein each of said at least one group of blades comprises a plurality of blades arranged helically and oriented to direct the gas or vapour in the direction of at least one discharge aperture.

7. Apparatus according to claim 6 which comprises a plurality of said groups of blades and a plurality of said cones, said groups of blades and said cones alternately spaced axially along said shaft.

8. Apparatus according to claim 2, comprising a plurality of said cones spaced axially along said shaft and oriented similarly, said tubular wall of said shaft having at least one of said apertures at the apex of each of said cones, each of said apertures communicating with the bore of said shaft for admission of liquid from said bore through said apertures into said tubular body.

* * * * *